United States Patent [19]
Iwamatsu

[11] Patent Number: 5,852,629
[45] Date of Patent: Dec. 22, 1998

[54] REPEATER

[75] Inventor: Takanori Iwamatsu, Kanagawa, Japan

[73] Assignee: Fujitsu Limited, Kanagawa, Japan

[21] Appl. No.: 263,686

[22] Filed: Jun. 22, 1994

[30] Foreign Application Priority Data

Dec. 10, 1993 [JP] Japan ................................ 5-310243

[51] Int. Cl.$^6$ .................................................. H04B 3/36
[52] U.S. Cl. ............................ 375/211; 375/371; 455/23
[58] Field of Search ............................ 375/211, 344; 455/22, 24, 20, 21, 23, 7, 11.1

[56] References Cited

U.S. PATENT DOCUMENTS

| | | | |
|---|---|---|---|
| 4,475,243 | 10/1984 | Batlivala et al. | 455/22 |
| 4,493,090 | 1/1985 | Gordon | 375/214 |
| 4,701,935 | 10/1987 | Namiki | 455/21 |
| 5,301,210 | 4/1994 | Vandamme et al. | 375/329 |
| 5,400,366 | 3/1995 | Iwamatsu | 375/344 |
| 5,440,587 | 8/1995 | Ishikawa et al. | 375/329 |

FOREIGN PATENT DOCUMENTS

| | | | |
|---|---|---|---|
| 019974 | 6/1976 | Germany | 455/22 |
| 2065421 | 6/1981 | United Kingdom | 455/24 |

*Primary Examiner*—Don N. Vo
*Attorney, Agent, or Firm*—Helfgott & Karas, P. C.

[57] ABSTRACT

A repeater wherein quadrature detection is performed using signal form a local oscillator nonsynchronized to a received carrier, and a baseband signal is reproduced, with the frequency and phase difference between the received carrier and the local oscillator being compensated for by means of a feedback loop consisting of a phase rotator, a controller, a loop filer, and a digital VCO. The reproduced baseband signal is quadratue-modulated with the signal from the local oscillator. The local oscillator necessary for the operation of the repeater is shared between the demodulator and the modulator; reductions in the size and cost of the repeater can be achieved.

2 Claims, 8 Drawing Sheets

REPEATER

BACKGROUND OF THE INVENTION

1. Field of the Invention

The present invention relates to a repeater for relaying transmitted signals along radio transmission channels where quadrature modulation, such as phase-shift keying (PSK), quadrature amplitude modulation (QAM), etc., is employed.

2. Description of the Related Art

A repeater comprises a demodulator (DEM) for reproducing a baseband signal from a received signal and a modulator (MOD) for modulating the reproduced baseband signal for retransmission. In the DEM, a voltage-controlled oscillator (VCO) is used that generates a signal synchronized to the carrier of the received signal containing frequency offset and phase jitter, and the baseband signal is obtained by quadrature-detecting the received signal with this locally generated signal. In the MOD, a high-stability, high-accuracy oscillator is used, with which the baseband signal is quadrature-modulated for retransmission.

Since the DEM and MOD are provided with respective local oscillators, as described above, an increase in the cost as well as in the size of the circuitry has been inevitable. Furthermore, since the frequencies of the two oscillators are not synchronized and are very close to each other, the DEM and MOD have had to be mounted on different printed circuit boards to avoid interference between them. This also has been a factor working against the reduction of the size of the circuitry.

SUMMARY OF THE INVENTION

It is an object of the present invention to provide a repeater that permits size and cost reductions.

According to the present invention, there is provided a repeater in which a quadrature-modulated received signal is demodulated for the reproduction of a baseband signal, and the reproduced baseband signal is then quadrature-modulated for retransmission, comprising: a local oscillator for outputting a local oscillation signal of a fixed frequency roughly equal to the carrier frequency of the received signal; a quadrature detector for performing quadrature detection by applying the local oscillation signal to the received signal; an error-component eliminator for eliminating error components which are related to the difference between the carrier and the local oscillation signal and which are contained in the output of the quadrature detector, prior to the reproduction of the baseband signal; and a quadrature modulator for quadrature-modulating the reproduced baseband signal by applying the local oscillation signal to the reproduced baseband signal.

The above configuration allows the use of one common local oscillator for both the DEM and MOD, thus achieving size and cost reductions.

DESCRIPTION OF THE PREFERRED EMBODIMENTS

Figure 1:
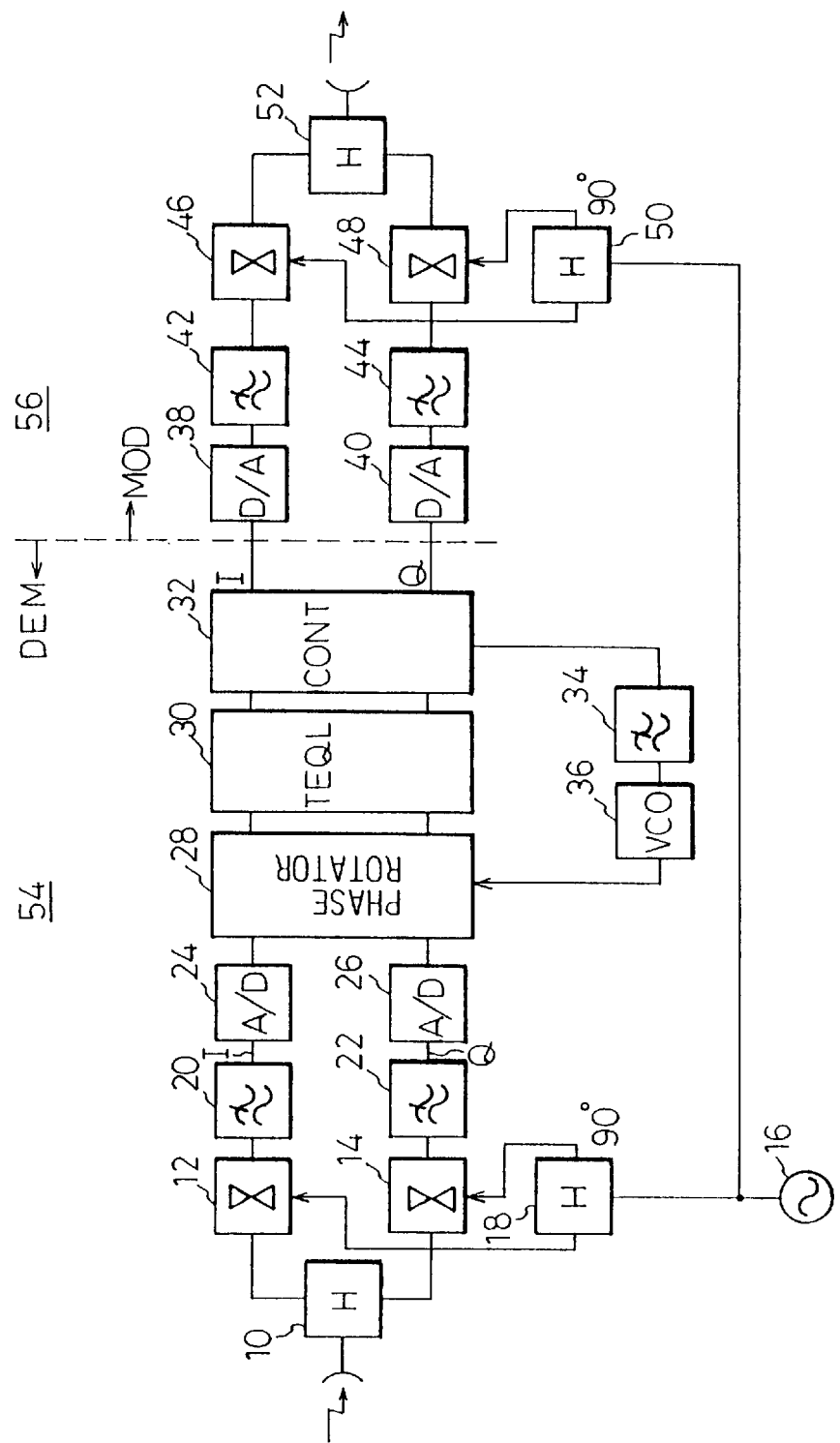
FIG. 1 is a block diagram illustrating a repeater according to one embodiment of the present invention.

FIG. 1 is a block diagram showing the configuration of a repeater according to one embodiment of the present invention. The demodulator (DEM) used in the repeater of the invention employs a digital carrier recovery (DCR) system in which quadrature detection is performed using a locally generated signal nonsynchronized to the received signal carrier, instead of synchronized quadrature detection that uses a locally generated signal synchronized to the received signal carrier, and digital signal processing is performed to compensate for error components (frequency offset and/or phase jitter), residual in the detected signal, related to the frequency difference and/or phase difference between the carrier and the locally generated signal.

Referring to FIG. 1, the received signal is divided by an in-phase hybrid 10 into two signals one of which is fed to one input of a mixer 12 and the other of which is fed to one input of a mixer 14. A locally generated signal from a local oscillator 16 is fed to a 90° hybrid 18 where the signal is divided into two signals whose phases are orthogonal to each other; the two signals are applied to the other inputs of the mixers 12 and 14, respectively. Output signals from the mixers 12 and 14 are supplied to low-pass filters 20 and 22, respectively, where the high-frequency components are removed, and the in-phase (I) signal and quadrature (Q) signal, each containing frequency offset and phase jitter, are output from the respective filters 20 and 22. The I and Q signals are fed to A/D converters 24 and 26, respectively, for conversion into digital signals which are passed through a phase rotator 28 and fed into a transversal equalizer 30 for waveshape equalization. The baseband signal consisting of the I and Q signals is thus reproduced. A controller 32, a loop filter 34, and a digital voltage-controlled oscillator (VCO) 36, together with the phase rotator 28, form a feedback loop for removing the frequency offset and phase jitter residual in the detected signal, the phase rotation in the phase rotator 28 being controlled so that the phase error detected by the controller 32 becomes zero. In applications where there is no need for waveshape equalization, the transversal equalizer 30 is omitted. The detailed configurations of the phase rotator 28, controller 32, loop filter 34, and digital VCO 36 will be described later.

The reproduced baseband signal is converted by D/A converters 38 and 40 into analog form, and fed into mixers 46 and 48 via low-pass filters 42 and 44. Using the signal supplied from the local oscillator 16, a 90° hybrid 50 generates signals whose phases are orthogonal to each other; these signals are applied to the other inputs of the mixers 46 and 48. Output signals from the mixers 46 and 48 are combined in an in-phase hybrid 52. In this manner, the signal generated by the same local oscillator 16 is used in common in both the DEM 54 and MOD 56.

Figure 2:
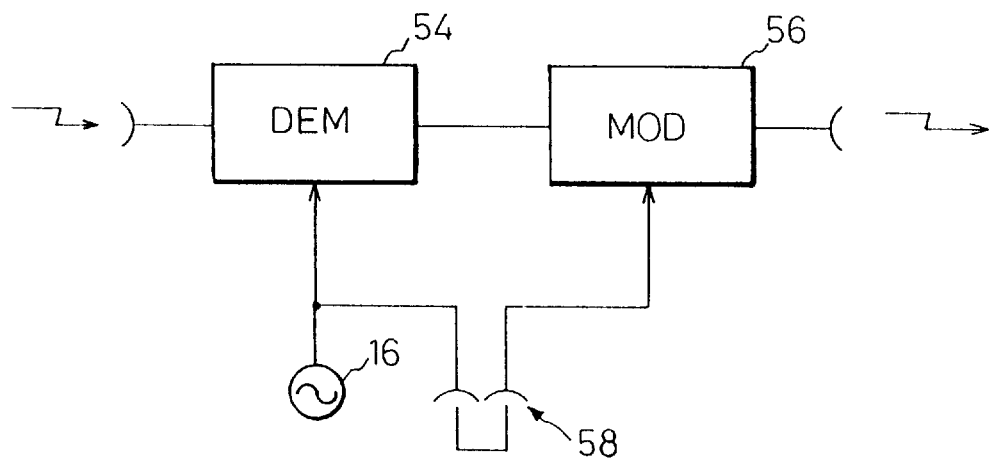
FIG. 2 is a block diagram illustrating a repeater that permits a loopback test, according to another embodiment of the present invention.
Figure 3:
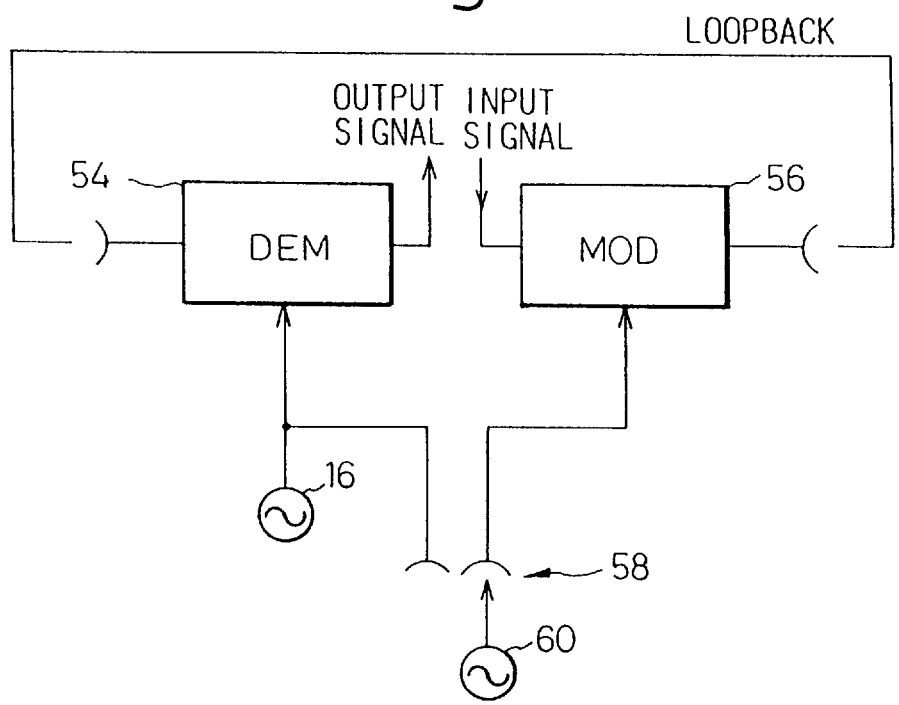
FIG. 3 is a diagram for explaining how the loopback test is conducted for the repeater of FIG. 2.

In a loopback test of the repeater, a test signal is input to the MOD and the output of the MOD is looped back to the DEM, thereby comparing the output of the DEM with the test signal to determine whether a fault exists or not. However, in the repeater of the present invention, since the locally generated signal in the DEM is always synchronized to the locally generated signal in the MOD, a test to determine the resistance to frequency variations cannot be conducted in this situation. To enable the test to be conducted, the signal line from the local oscillator 16 to the MOD 56 is made separable by an external connection terminal 58, as shown in FIG. 2, and when conducting a loopback test, a signal generated by an external oscillator 60 is fed as a local oscillation signal to the MOD 56, as shown in FIG. 3. With this configuration, a test for determining the resistance to frequency variations can be conducted.

Figure 4:
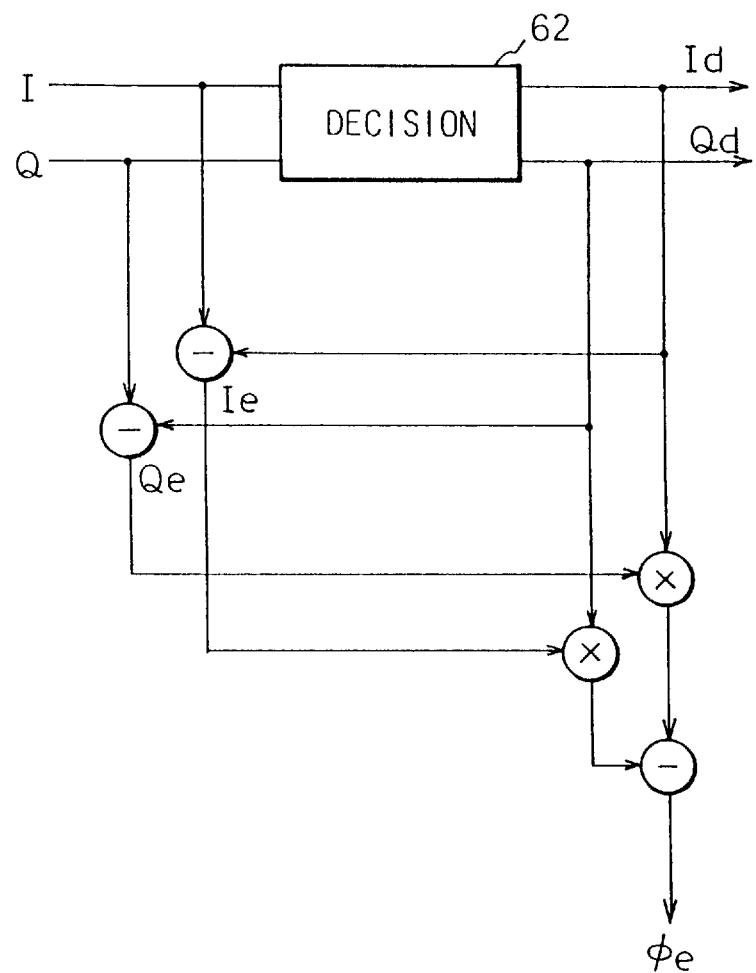
FIG. 4 is a diagram showing the detailed configuration of a controller 32 shown in FIG. 1.

FIG. 4 shows an example of the configuration of the controller 32 shown in FIG. 1. In the example shown in FIG. 4, the phase error $\phi_e$ in the baseband signal is calculated based on the approximation $$\phi_e \approx I_d \cdot Q_e - I_e \cdot Q_d$$

as described in Japanese Unexamined Patent Publication (Kokai) No. 57-31253. In this approximation, $I_d$ and $Q_d$ are the decision values for the I and Q phases, respectively, obtained as a result of the decisions made by a decision making device 62 at each symbol timing, and $I_e$ and $Q_e$ are decision errors for the I and Q phases, respectively. For the calculation of the phase error $\phi_e$, various other methods are possible, any of which is, of course, applicable in this example. In the actual configuration, for example, in the case of 256 QAM, the threshold values for the A/D converters 24 and 26 are set so that the four high-order bits in the digital values of the I and Q phases at each symbol timing correspond to $I_d$ and $Q_d$, respectively, and the low-order bits correspond to $I_e$ and $Q_e$, respectively.

Figure 5:
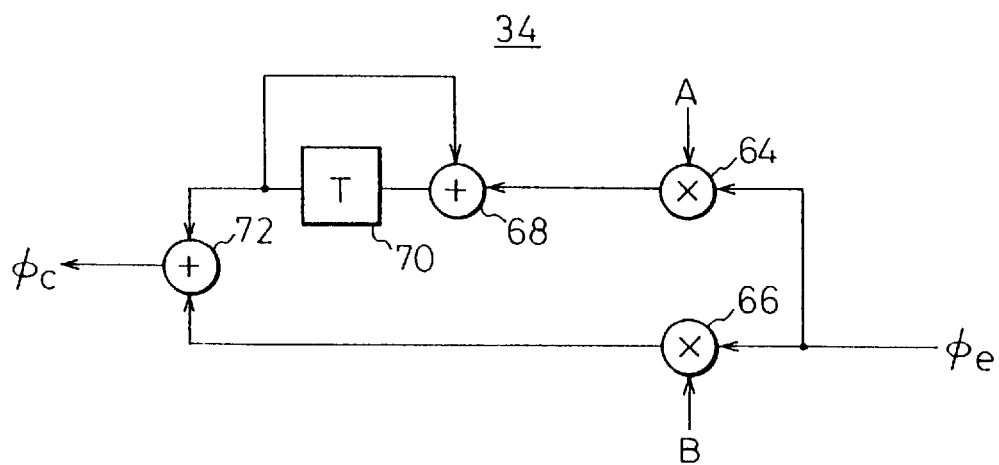
FIG. 5 is a diagram showing the detailed configuration of a loop filter 34 shown in FIG. 1.

FIG. 5 shows one example of the detailed configuration of the loop filter 34 shown in FIG. 1. The phase error $\phi_e$ input to the filter is directed along a first path to a multiplier 64 and along a second path to a multiplier 66. In the first path, the input value is multiplied by a constant A in the first multiplier 64 and then integrated by means of an adder 68 and a delay line 70. In the second path, the input value is multiplied by a constant B in the multiplier 66 and the result is fed to an adder 72 where it is added to the output from the first path. The result of the addition is output as a phase control value $\phi_c$. Since a value proportional to the average value of the phase error $\phi_e$ is output from the first path, as described above, a control value to compensate for the frequency offset is created from the output of the first path. Similarly, since a value proportional to the instantaneous value of the phase error $\phi_e$ is output from the second path, a control value to compensate for the phase jitter is created from the output of the second path.

Figure 6:
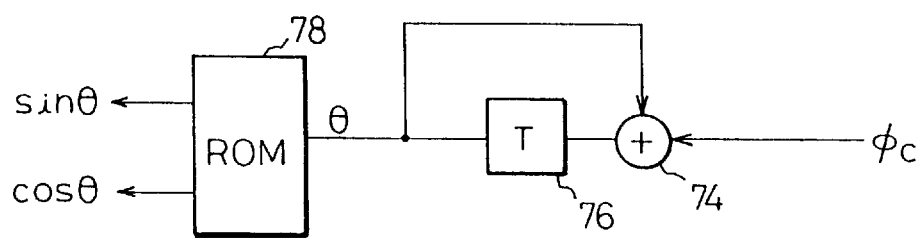
FIG. 6 is a diagram showing the detailed configuration of a digital VCO 36 shown in FIG. 1.

FIG. 6 shows an example of the detailed configuration of the digital VCO 36. The phase control value $\phi_c$ is integrated by an adder 74 and a delay line 76, to generate a rotating phase θ. Further, the phase θ is converted by a ROM 78 to sinθ and cosθ which are output.

Figure 7:
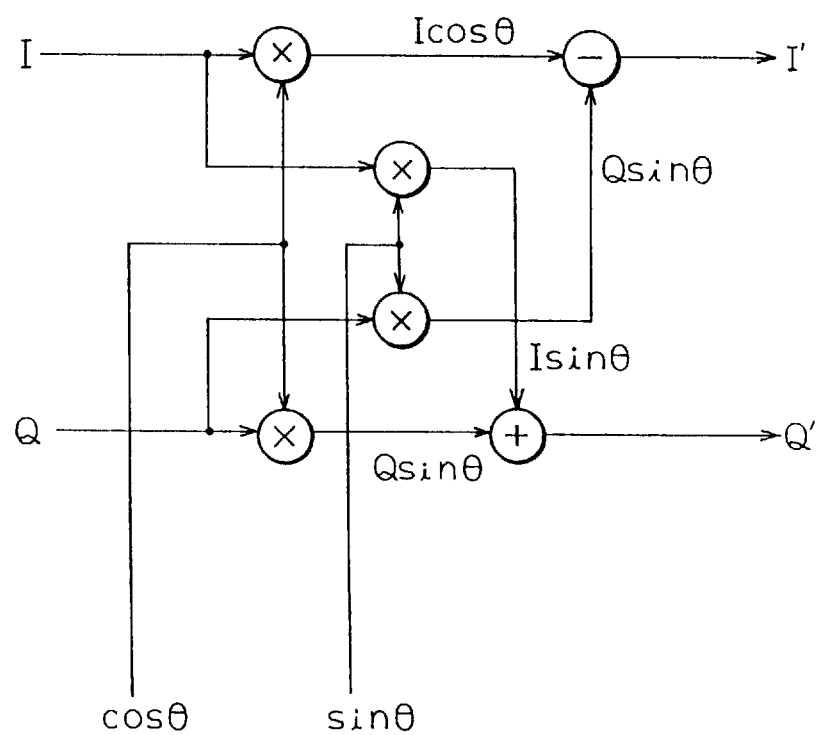
FIG. 7 is a diagram showing the detailed configuration of a phase rotator 28 shown in FIG. 1.

FIG. 7 is a diagram showing the detailed configuration of the phase rotator 28. In the phase rotator 28, the phases of the quadrature signals I and Q are rotated by θ to obtain I' and Q' in accordance with the following equations.

$$I' = I \cos\theta - Q \sin\theta$$

$$Q' = I \sin\theta + Q \cos\theta$$

Using the thus constructed controller 32, loop filter 34, digital VCO 36, and phase rotator 28, feedback control is performed so that the frequency difference and/or the phase error $\phi_e$ due to the phase difference between the received carrier and the local oscillation signal become zero, thus reproducing the baseband signal free from the rotation due to the frequency offset and/or the phase jitter.

Figure 8:
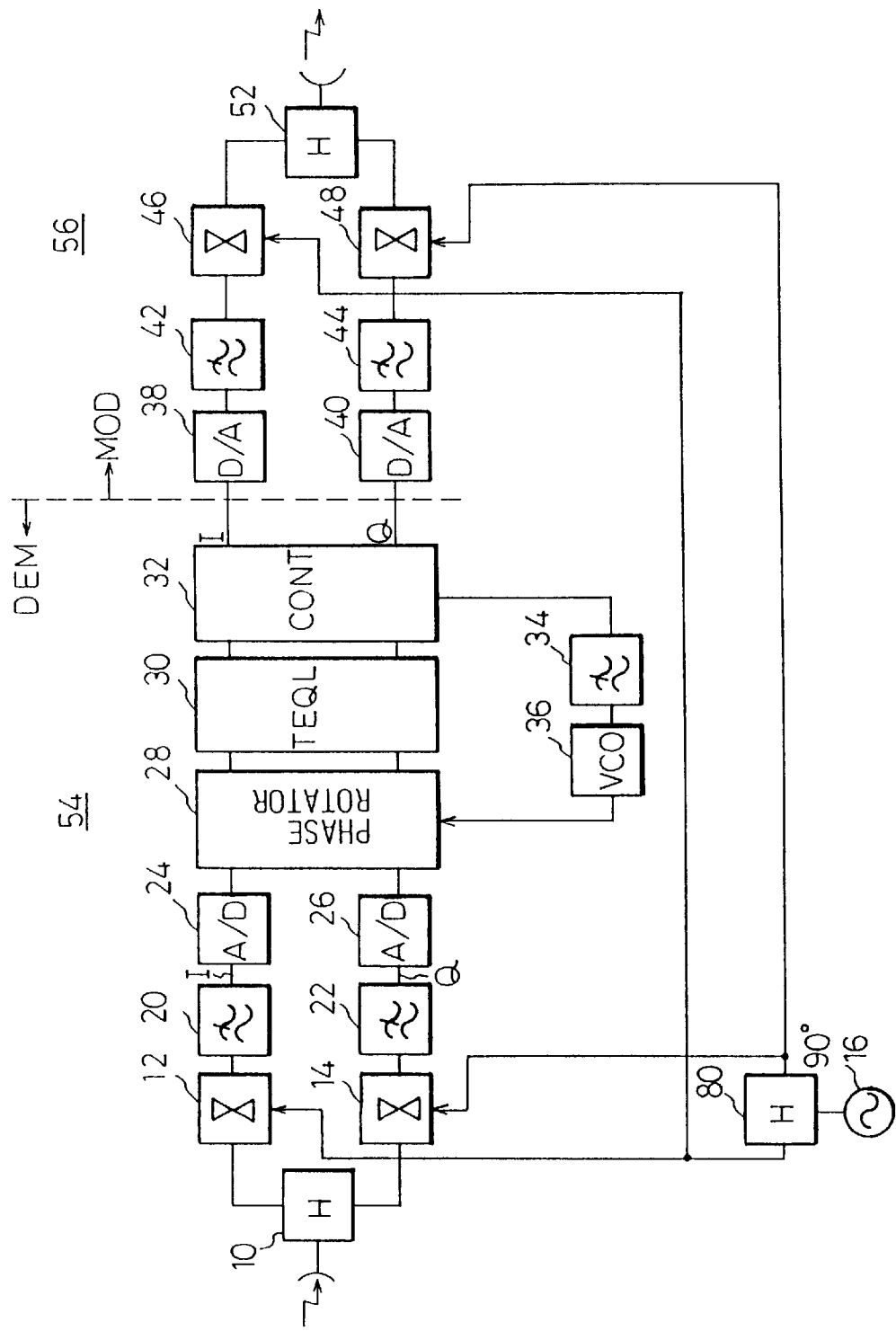
FIG. 8 is a block diagram illustrating a repeater according to another embodiment of the present invention.

FIG. 8 is a block diagram showing the configuration of a repeater according to another embodiment of the present invention. In this embodiment, not only the local oscillator 16 but also the 90° hybrid are provided common to the DEM 54 and MOD 56. In this configuration, the quadrature detection section in the DEM, consisting of the in-phase hybrid 10 and the mixers 12 and 14, are arranged adjacent to the quadrature modulation section consisting of the mixers 46, 48 and the in-phase hybrid 52. Since the 90° hybrid is shared between the DEM and MOD, not only is the number of parts reduced, but the number of steps for 90° adjustment is also reduced.

Figure 9:
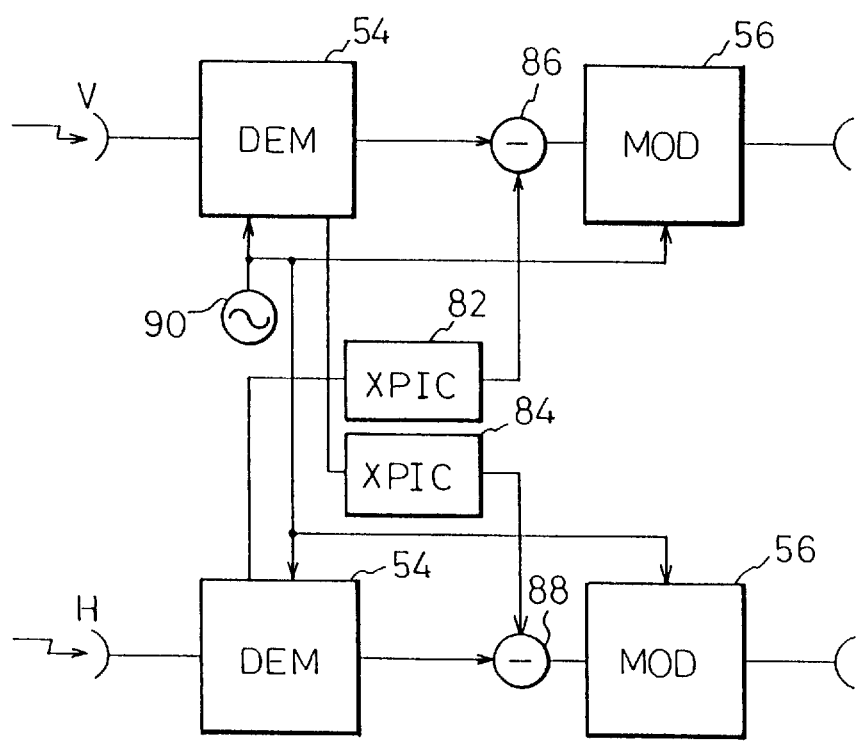
FIG. 9 is a block diagram illustrating a repeater according to another embodiment of the present invention.

FIG. 9 is a block diagram showing the configuration of a repeater, according to a further embodiment of the invention, specifically designed for relaying transmitted signals along radio transmission channels where a cross-polarization sharing system is employed that makes use of two polarizations (V polarization and H polarization) of the same frequency, with their polarization planes perpendicular to each other, for effective frequency utilization. In FIG. 9, the DEM 54 and MOD 56 are identical in configuration to those shown in FIGS. 1 or 8. Cross-polarization interference compensators (XPICs) 82 and 84 each generate a compensation signal from the received signal of opposite polarization, and the thus generated compensation signals are fed to respective subtractors 86 and 88 where subtraction is performed to compensate for the cross polarization interference distortion. This improves the cross-polarization discrimination (XPD).

In the same manner as previously described, a local oscillation signal is supplied to the DEM 54 and MOD 56 in the V polarization section from a common local oscillator 90. The signal from the local oscillator 90 is also supplied to the DEM 54 and MOD 56 in the H polarization section since the local oscillation signal of the transmitter must be synchronized between the V polarization and H polarization sections in order for the XPICs to operate.

Figure 10:
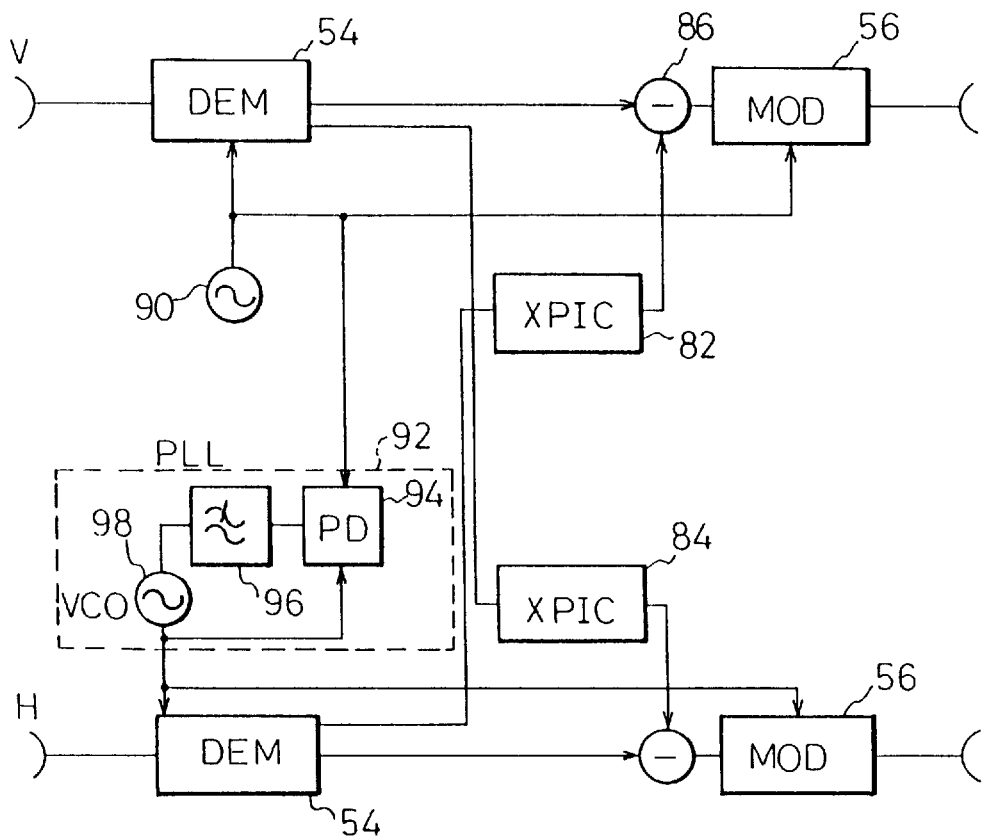
FIG. 10 is a block diagram illustrating a repeater according to another embodiment of the present invention.

In the configuration of FIG. 9, not only the V polarization section but also the H polarization section would be rendered inoperative in the event of failure of the local oscillator 90. FIG. 10 is a block diagram showing the configuration of a repeater that improves on this point. In FIG. 10, the output of the local oscillator 90 is directly supplied to the DEM 54 and MOD 56 in the V polarization section, whereas the same output is supplied not directly to the DEM 54 and MOD 56 in the H polarization section, but via a PLL circuit 92. The PLL circuit 92 has a known configuration, consisting of a phase comparator 94, a loop filter 96, and a voltage-controlled oscillator 98, and supplies a signal, synchronized in phase to the output of the local oscillator 90, to the DEM 54 and MOD 56 in the H polarization section.

In the configuration of FIG. 10, if a failure occurs in the local oscillator 90, the VCO 98 is allowed to free-run, so that the H polarization section remains operative.

As described, according to the present invention, the local oscillator is shared between the demodulator and the modulator, which achieves cost and size reductions and simplifies adjustment.

I claim:

1. A repeater in which a quadrature-modulated received signal is demodulated for the reproduction of a baseband signal, and the reproduced baseband signal is then quadrature-modulated for retransmission, comprising:

a local oscillator for outputting a local oscillation signal of a fixed frequency roughly equal to a carrier frequency of a received signal that is modulated with a baseband signal;

a quadrature detector for performing quadrature detection by applying the local oscillation signal to the received signal to reproduce said baseband signal;

an error-component eliminator for eliminating error components which are related to the difference between the carrier frequency and the local oscillation signal frequency and which are contained in an output of the quadrature detector, prior to the reproduction of the baseband signal; and a quadrature modulator for quadrature-modulating the reproduced baseband signal for retransmission by applying the local oscillation signal to the reproduced baseband signal, wherein the received signal includes a primary-polarization received signal carried on a primary polarized wave and a cross-polarization received signal carried on a cross-polarized wave normal to the primary polarized wave, the quadrature detector includes a first quadrature detection circuit for performing quadrature detection by applying the local oscillation signal to the primary-polarization received signal, and a second quadrature detection circuit for performing quadrature detection by applying the local oscillation signal to the cross-polarization received signal;

the error-component eliminator includes a first error-component elimination circuit for reproducing the primary-polarization baseband signal by eliminating the error components contained in the output of the first quadrature detection circuit, and a second error-component elimination circuit for reproducing the cross-polarization baseband signal by eliminating the error components contained in the output of the second quadrature detection circuit, and the quadrature modulator includes a first quadrature modulation circuit for quadrature-modulating the reproduced primary-polarization baseband signal by applying the local oscillation signal to the reproduced primary-polarization baseband signal, and a second quadrature modulation circuit for quadrature-modulating the reproduced cross-polarization baseband signal by applying the local oscillation signal to the reproduced cross-polarization baseband signal.

2. A repeater in which a quadrature-modulated received signal is demodulated for the reproduction of a baseband signal, and the reproduced baseband signal is then quadrature-modulated for retransmission, comprising:

a local oscillator for outputting a local oscillation signal of a fixed frequency roughly equal to a carrier frequency of a received signal that is modulated with a baseband signal;

a quadrature detector for performing quadrature detection by applying the local oscillation signal to the received signal to reproduce said baseband signal;

an error-component eliminator for eliminating error components which are related to the difference between the carrier frequency and the local oscillation signal frequency and which are contained in an output of the quadrature detector, prior to the reproduction of the baseband signal; and a quadrature modulator for quadrature-modulating the reproduced baseband signal for retransmission by applying the local oscillation signal to the reproduced baseband signal, a PLL circuit for outputting a locally generated synchronized signal that is synchronized to the local oscillation signal, wherein the received signal includes a primary-polarization received signal carried on a primary polarized wave and a cross-polarization received signal carried on a cross-polarized wave normal to the primary polarized wave, the quadrature detector includes a first quadrature detection circuit for performing quadrature detection by applying the local oscillation signal to the primary-polarization received signal, and a second quadrature detection circuit for performing quadrature detection by applying the locally generated synchronized signal to the cross-polarization received signal;

the error-component eliminator includes a first error-component elimination circuit for reproducing the primary-polarization baseband signal by eliminating the error components contained in the output of the first quadrature detection circuit, and a second error-component elimination circuit for reproducing the cross-polarization baseband signal by eliminating the error components contained in the output of the second quadrature detection circuit, and the quadrature modulator includes a first quadrature modulation circuit for quadrature-modulating the reproduced primary-polarization baseband signal by applying the local oscillation signal to the reproduced primary-polarization baseband signal, and a second quadrature modulation circuit for quadrature-modulating the reproduced cross-polarization baseband signal by applying the locally generated synchronized signal to the reproduced cross-polarization baseband signal.

* * * * *